March 23, 1926.
O. C. LARSON
1,577,913
REMOVABLE VALVE SEAT
Filed March 24, 1925
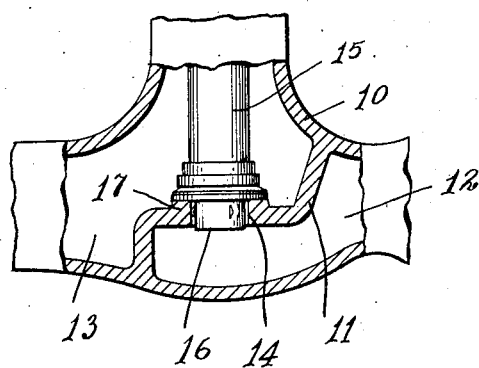
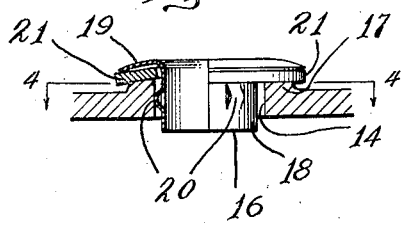 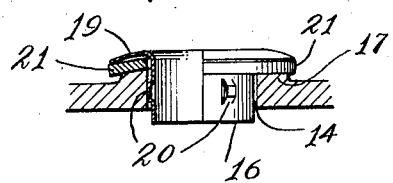
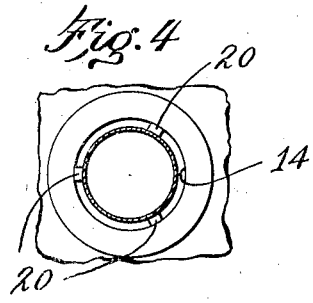 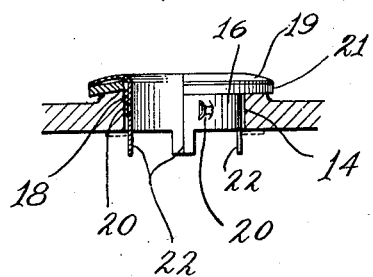
INVENTOR
Otto C. Larson
BY
Howard C. Thompson
ATTORNEY Patented Mar. 23, 1926.

1,577,913

UNITED STATES PATENT OFFICE.

OTTO C. LARSON, OF BROOKLYN, NEW YORK.

REMOVABLE VALVE SEAT.

Application filed March 24, 1925. Serial No. 17,859.

*To all whom it may concern:*

Be it known that I, OTTO C. LARSON, a citizen of the United States, and residing at Brooklyn, in the county of Kings and State of New York, have invented certain new and useful Improvements in Removable Valve Seats, of which the following is a specification, such as will enable those skilled in the art to which it appertains to make and use the same.

This invention relates to valves of various kinds and classes and particularly to the provision of removable valve seats in connection with devices of this class whereby in the event of the destruction of a valve seat, the same may be repaired by one of my improved devices without the necessity of discarding the entire valve device and replacing a new one; and the object of the invention is to provide a removable valve seat which is so constructed as to facilitate the mounting thereof in connection with valves, the port and seat construction of which varies slightly in size or is of varying dimensions in different types of valve constructions or designs without necessitating the making of removable seats of a size to equal that of the numerous sizes commonly employed but to provide for the variation in size in a comparatively few models, which are so constructed as to adapt each of the models for use in connection with valve seats having slight variations in size; a still further object being to provide in addition to the foregoing feature means for retaining the valve seats against accidental displacement in addition to frictional means employed; and with these and other objects in view the invention consists in a valve seat of the class and for the purpose specified which is simple in construction and efficient in use.

The invention described and claimed herein is an improvement on that shown and described in a patent granted to me May 13, 1924, No. 1,493,784, and the invention is fully disclosed in the following specification, of which the accompanying drawing forms a part, in which the separate parts of my improvement are designated by suitable reference characters in each of the views, and in which:—

Fig. 1 is a sectional view of a part of a valve device showing the seat portion thereof and illustrating one of my improved valve seats mounted in connection therewith;

Fig. 2 is a detail view of the construction shown in Fig. 1 on an enlarged scale with part of the valve seat shown in section;

Fig. 3 is a view similar to Fig. 2 but showing the valve seat mounted in a valve having a port of less diameter than that shown in Fig. 2;

Fig. 4 is a section on the line 4—4 of Fig. 2; and,

Fig. 5 is a view similar to Figs. 2 and 3 but showing a modification.

In Fig. 1 of the drawing I have shown for the purpose of illustrating one use of my invention, a part of a faucet 10, the body of which is provided with the usual partition wall 11 dividing the intake side 12 of the faucet from the exhaust side 13 thereof. The wall 11 is provided with the usual port or passage 14 controlled by a valve 15 which is operated in any desired manner, and in said figure I have shown at 16 one of my improved valve seats mounted upon a raised portion 17 surrounding the port 14 in the wall 11.

The valve seat 16 is fashioned from sheet metal, preferably of brass, copper or similar non-corrosive material and comprises a tubular body portion 18, the upper end of which is flared outwardly and slightly downwardly to form a projecting annular flange 19. The tubular body portion 18, substantially centrally thereof, is pressed out radially at a number of points to form a plurality of projecting knob members 20 having spring tension to render the same rigid and yet compressible.

I also employ a ring gasket 21 of lead or any other desired material, which gasket is normally held in position upon the valve seat 16 by the projecting knob members 20 in shipping said seats from place to place in a box or other container, thus keeping the separate parts of the entire seat in assembled condition at all times, and also facilitating the placement of the valve seat in a valve device of any kind or class.

In Fig. 2 of the drawing, I have shown my improved removable valve seat 16 mounted upon the raised portion 17 or seat of the valve body 10, and in this showing the port or passage 14 is of such size that the knobs 20 fit snugly therein and have sufficient friction or contact to hold the seat in position in the operation of the valve device 10.

In Fig. 3 of the drawing, I have shown the removable valve seat 16 mounted in a port 14 of slightly less diameter, in which case, the knob members 20 are compressed inwardly to a greater degree than in the construction shown in Fig. 2 of the drawing, and it will be understood that one size or model of my improved removable valve seat may be used in connection with a port the diameter of which is equal to, or substantially equal to, the outside diameter of the tubular body portion 18, in which event the knob members 20 will be fully compressed, while the largest port 14 with which said size may be used would have dimensions slightly less than the greatest outside dimensions of the knob members 20.

For an ordinary faucet, globe valve and similar use, that is to say, I have found that three sizes or models would be sufficient to compensate for the variation in sizes of ports in such valve devices, however, it will be understood that in other forms and uses of valve seats an additional number of models will be necessary, but in all cases each and every model will compensate for a varying number of sizes within the limits and restrictions above set out in connection with the description of Figs. 2 and 3 of the drawing.

In Fig. 5 of the drawing, I have shown the lower end portion of the tubular body 18 extended to form, about the periphery thereof, a plurality of projecting tongues 22 which may be folded outwardly and radially to lock the valve seat against accidental displacement from the valve body, especially when my improved removable valve seat is employed in connection with valves subjected to extremely high pressures. It will be understood that a suitable tool will be provided for bending the tongues 22 outwardly.

This type of valve seat will only be necessary for use in valves subject to high pressure. In the construction shown in Figs. 1 to 4 inclusive as well as that shown in Fig. 5, the valve seat 16 is dropped into position in the valve body with the tubular body portion 18 extending into the port 14 and in placing said seat in proper position, all that is necessary to do is to screw or otherwise move the valve 15 into closed position and the pressure of the valve 15 on the seat 16 will move the same into its proper position and effect a seal between the flange 19 and the gasket 21. The gasket employed is composed of such material as to suit the specific use to which the valve device, as a whole, is subjected.

In view of the simplicity of my improved valve device, both in the construction and use, the same may be produced at a very nominal cost and placed in a suitable valve in a short space of time saving the cost of the replacement of a valve, the seat of which has been worn out, and while I have shown and described a particular form of valve device, it will be understood that I am not necessarily limited to the specific form and construction of the device herein shown and described, and various other changes therein and modifications thereof may be made, within the scope of the appended claims, without departing from the spirit of my invention or sacrificing its advantages.

Having fully described my invention, what I claim as new and desire to secure by Letters Patent, is:—

1. A removable valve seat of the class described comprising a tubular body, one end portion of which is enlarged radially, a gasket adapted to be mounted on said body and adjacent the enlarged portion thereof, said tubular body being provided intermediate the ends thereof with a plurality of outwardly pressed knob members adapted to engage the walls of the port of a valve to frictionally retain said seat in connection therewith, and said knob members being adapted to be compressed inwardly and radially to compensate said valve seat to ports of different sizes.

2. A removable valve seat of the class described comprising a tubular body one end portion of which is flared radially to form an annular projecting flange, a plurality of projecting members on the periphery of said tubular body intermediate its ends, and a gasket adapted to be mounted in connection with said tubular body and retained against displacement therefrom by said flange and said projecting members when the valve seat is not in use.

3. A removable valve seat of the class described comprising a tubular body one end portion of which is flared radially to form an annular projecting flange, a plurality of projecting members on the periphery of said tubular body intermediate its ends, a gasket adapted to be mounted in connection with said tubular body and retained against displacement therefrom by said flange and said projecting members when the valve seat is not in use, and said projecting members being yieldable to compensate said seat for use in connection with valves having ports of different sizes.

4. A valve seat of the class described comprising a tubular body one end portion of which is flared radially to form an annular projecting flange, a plurality of projecting members on the periphery of said tubular body, a gasket adapted to be mounted in connection with said tubular body and retained against displacement therefrom by said flange and said projecting members, said projecting members being yieldable to compensate said seat for use in connection with valves having ports of different sizes, and means independent of said projecting members for retaining said valve seats against accidental displacement in connection with valve devices.

5. A valve seat of the class described comprising a tubular body one end portion of which is flared radially to form an annular projecting flange, a plurality of projecting members on the periphery of said tubular body, a gasket adapted to be mounted in connection with said tubular body and retained against displacement therefrom by said flange and said projecting members, said projecting members being yieldable to compensate said seat for use in connection with valves having ports of different sizes, means independent of said projecting members for retaining said valve seat against accidental displacement in connection with valve devices, said last named means comprising a plurality of projecting members at the other end portion of said tubular body, and said members being foldable outwardly and radially of said body.

6. A removable valve seat of the class described comprising a tubular body provided with projecting yieldable means adapted to extend into the port of a valve device and to frictionally engage the walls of said port to retain said seat in connection with said valve device, and means including said yieldable means for retaining a gasket in connection with said body when the valve seat is not in use.

In testimony that I claim the foregoing as my invention I have signed my name this 21st day of March 1925.

OTTO C. LARSON.